(12) United States Patent
Sorkin

(10) Patent No.: US 11,090,885 B2
(45) Date of Patent: Aug. 17, 2021

(54) APPARATUS FOR REPAIRING A TENSION MEMBER

(71) Applicant: Felix Sorkin, Stafford, TX (US)

(72) Inventor: Felix Sorkin, Stafford, TX (US)

(*) Notice: Subject to any disclaimer, the term of this patent is extended or adjusted under 35 U.S.C. 154(b) by 0 days.

(21) Appl. No.: 16/876,000

(22) Filed: May 16, 2020

(65) Prior Publication Data
US 2020/0376611 A1  Dec. 3, 2020

Related U.S. Application Data

(60) Provisional application No. 62/853,602, filed on May 28, 2019.

(51) Int. Cl.
| | |
|---|---|
| *B29C 73/04* | (2006.01) |
| *B23P 6/04* | (2006.01) |
| *E04C 5/10* | (2006.01) |
| *E04G 21/12* | (2006.01) |
| *E04G 23/02* | (2006.01) |

(52) U.S. Cl.
CPC ............... *B29C 73/04* (2013.01); *B23P 6/04* (2013.01)

(58) Field of Classification Search
CPC . B29C 73/04; B23P 6/04; E04G 23/02; E04G 21/12; E04C 5/10
See application file for complete search history.

(56) References Cited

U.S. PATENT DOCUMENTS

| | | | | | |
|---|---|---|---|---|---|
| 3,258,031 | A | * | 6/1966 | French | F16C 1/06 138/127 |
| 5,749,185 | A | * | 5/1998 | Sorkin | E04C 5/12 24/122.6 |
| 5,755,065 | A | * | 5/1998 | Sorkin | E04C 5/12 52/223.13 |
| 5,770,286 | A | * | 6/1998 | Sorkin | E04C 5/08 138/96 R |

(Continued)

FOREIGN PATENT DOCUMENTS

| | | | | |
|---|---|---|---|---|
| EP | 3269894 A1 | * | 1/2018 | ............... E04C 5/08 |
| EP | 3269894 A1 | | 1/2018 | |

(Continued)

OTHER PUBLICATIONS

Extended European Search Report issued in EP App. No. 20175338.1 dated Oct. 26, 2020 (21 pages).

*Primary Examiner* — Bayan Salone
(74) *Attorney, Agent, or Firm* — Locklar PLLC

(57) ABSTRACT

An assembly and method for repairing sheathing on a tension member of a post-tensioning tendon may include an outer tube having first and second end portions, a tubular long seal positioned inside the outer tube, the tubular long seal being shorter than the outer tube, first and second seals positioned in the first and second end portions of the outer tube, respectively, and first and second nuts retaining the first and second seals in the first and second end portions of the outer tube, respectively. The assembly may define a longitudinal passage adapted to receive the tension member and (Continued)

the presence of the assembly on the tension member seals the portion of the tension member that is within the assembly. An inner tube may be positioned between the outer tube and the tubular long seal and may radially compress the tubular long seal.

17 Claims, 1 Drawing Sheet

(56) References Cited

U.S. PATENT DOCUMENTS

| | | | | |
|---|---|---|---|---|
| 6,098,356 | A * | 8/2000 | Sorkin | E04C 5/12 24/122.6 |
| 6,151,850 | A * | 11/2000 | Sorkin | E04C 5/08 52/223.1 |
| 6,381,912 | B1 * | 5/2002 | Sorkin | E04C 5/08 24/459 |
| 6,631,596 | B1 * | 10/2003 | Sorkin | E04C 5/12 24/122.6 |
| 6,817,148 | B1 * | 11/2004 | Sorkin | E04C 5/12 24/122.6 |
| 7,055,288 | B2 * | 6/2006 | Coogan | E04C 5/10 52/222 |
| 7,793,473 | B2 * | 9/2010 | Sorkin | E04C 5/12 52/223.13 |
| 7,797,894 | B1 * | 9/2010 | Sorkin | E04C 5/122 52/223.13 |
| 7,823,345 | B1 * | 11/2010 | Sorkin | E04C 5/122 52/223.13 |
| 7,841,061 | B1 * | 11/2010 | Sorkin | E04C 5/122 29/452 |
| 7,841,140 | B1 * | 11/2010 | Sorkin | E04C 5/122 52/223.13 |
| 7,950,196 | B1 * | 5/2011 | Sorkin | E04G 21/12 52/223.13 |
| 7,950,197 | B1 * | 5/2011 | Sorkin | E04C 5/10 52/223.13 |
| 7,963,078 | B1 * | 6/2011 | Sorkin | E04C 5/122 52/223.13 |
| 8,015,774 | B1 * | 9/2011 | Sorkin | E04C 5/122 52/745.21 |
| 8,065,845 | B1 | 11/2011 | Sorkin | |
| 9,097,014 | B1 * | 8/2015 | Sorkin | E04C 5/122 |
| 10,113,313 | B2 * | 10/2018 | Sorkin | E04C 5/122 |
| 10,196,820 | B2 * | 2/2019 | Sorkin | E04C 5/165 |
| 10,378,210 | B2 * | 8/2019 | Hayes | E04G 21/12 |
| 2004/0206026 | A1 * | 10/2004 | Coogan | E04C 5/10 52/222 |
| 2018/0016789 | A1 * | 1/2018 | Sorkin | E04C 5/165 |
| 2018/0023298 | A1 * | 1/2018 | Hayes | E04G 21/12 52/223.13 |

FOREIGN PATENT DOCUMENTS

| | | | |
|---|---|---|---|
| JP | 2018024983 A | * | 2/2018 |
| JP | 2018024983 A | | 2/2018 |
| WO | 2016126687 A1 | | 8/2016 |
| WO | WO-2016126687 A1 | * | 8/2016 ............ E04G 21/12 |

* cited by examiner

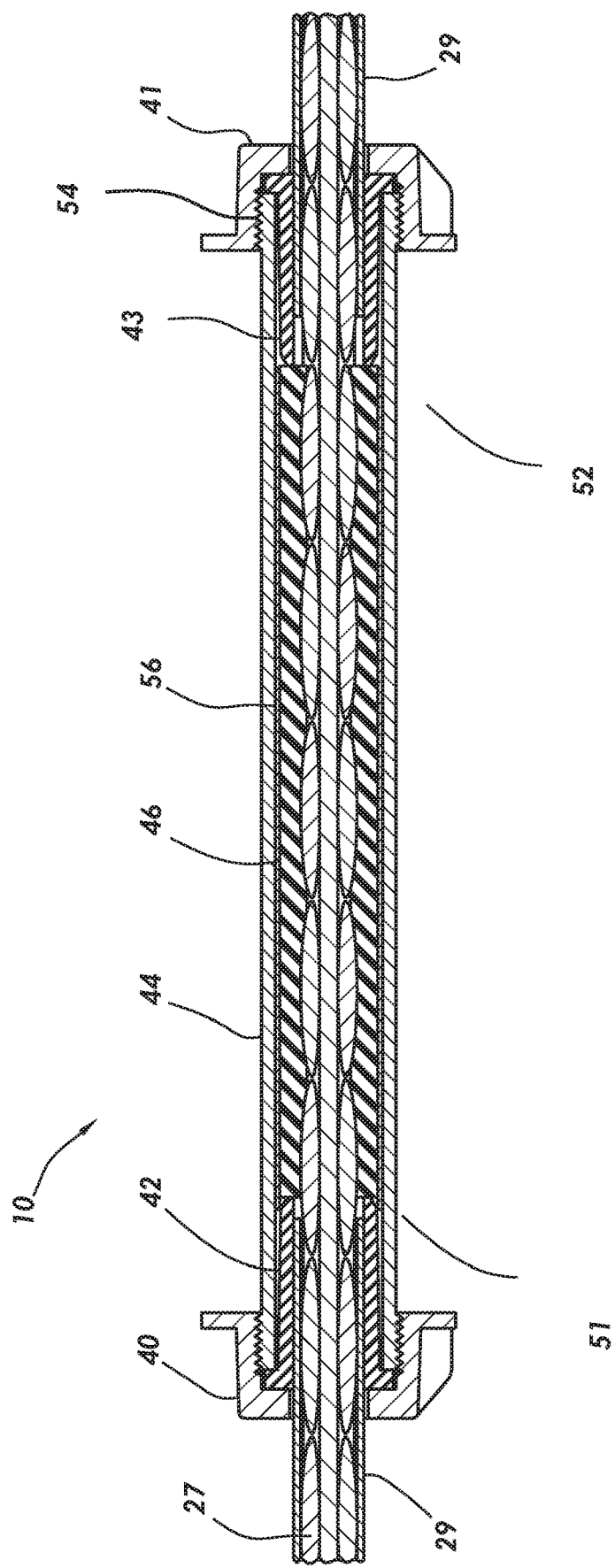

APPARATUS FOR REPAIRING A TENSION MEMBER

CROSS-REFERENCE TO RELATED U.S. APPLICATIONS

This application is a non-provisional application that claims priority from U.S. provisional application 62/853,602, filed May 28, 2019, which is hereby incorporated by reference in its entirety.

TECHNICAL FIELD/FIELD OF THE DISCLOSURE

The present disclosure relates to an apparatus for use in post-tensioning concrete.

BACKGROUND OF THE DISCLOSURE

Many structures are built using concrete, including, for instance, buildings, parking structures, apartments, condominiums, hotels, mixed-use structures, casinos, hospitals, medical buildings, government buildings, research/academic institutions, industrial buildings, malls, bridges, pavement, tanks, reservoirs, silos, foundations, sports courts, and other structures.

The concrete may be poured into a concrete form. The concrete form may be a form or mold to give shape to the concrete as the concrete sets or hardens, thus forming a concrete member.

Prestressed concrete is structural concrete in which internal stresses are introduced to reduce potential tensile stresses in the concrete resulting from applied loads; prestressing may be accomplished by post-tensioned prestressing or pre-tensioned prestressing. In post-tensioned prestressing, a post-tensioning tendon embedded in the concrete is tensioned after the concrete has attained a specified strength. A post-tensioning tendon may include for example and without limitation, anchorages, the tension member, and sheathes or ducts.

A post-tensioning tendon generally includes an anchorage at each end. The tension member is fixedly coupled to a fixed anchor positioned at one end of the post-tensioning tendon, sometimes referred to as the "fixed-end" or "dead end" anchor, and is stressed at the other anchor, sometimes referred to as the "stressing-end" or "live end" anchor.

The tension member may be constructed of a material that is suitable for post-tensioning, such as, for example, reinforcing steel or composite material in the form of single or multi-strand cable. A post-tensioning tension member is typically provided in a protective sheath. The sheath may be polymeric and may contain a protective fluid, such as grease, in addition to the tension member. The purpose of the sheath and protective fluid, if present, is to inhibit air, water, and other corrosive substances from contacting the tension member.

The tension member is stressed by pulling the tension member through the stressing anchor; when the pulling force is released, the anchors grip the tension member and retain the tension member in tension. In some instances, the anchors grip the tension member using wedges, so that the gripping force increases when the tension on the tension member increases.

SUMMARY

A sheathing repair assembly for a tension member of a post-tensioning tendon may comprise an outer tube having first and second end portions, a tubular long seal positioned inside the outer tube, a first seal positioned in the first end portion of the outer tube, a second seal positioned in the second end portion of the outer tube, a first nut retaining the first seal in the first end portion of the outer tube, and a second nut retaining the second seal in the second end portion of the outer tube.

The sheathing repair assembly may further comprise an inner tube positioned between the outer tube and the tubular long seal. The first seal may be configured such that mechanically coupling the first nut to the outer tube causes the first seal to fill an annular space defined between the outer tube, the tubular long seal, the tension member, and the first nut, and the second seal may be configured such that mechanically coupling the second nut to the outer tube causes the second seal to fill an annular space defined between the outer tube, the tubular long seal, the tension member, and the second nut.

The outer tube may not have a longitudinal slit. The first and second seals may each have a longitudinal slit. The tubular long seal may have a longitudinal slit.

The tension member may have an unsheathed portion and the tubular long seal may be long enough to fully cover the unsheathed portion. The tubular long seal may be long enough to extend beyond the unsheathed portion.

A method for repairing an unsheathed portion of a sheathed tension member, may comprise the steps of: a) providing a sheathing repair assembly comprising an outer tube having first and second end portions, a tubular long seal sized to fit onto the tension member, a first seal sized to fit onto the tension member, a second seal sized to fit onto the tension member, a first nut adapted to mechanically couple to one end portion, and a second nut adapted to mechanically couple to one end portion, b) positioning the tubular long seal at the unsheathed portion, c) positioning the outer tube around the tubular long seal, d) inserting the first seal into the first end portion and coupling the first nut to the first end portion so as to retain the first seal therein, e) inserting the second seal into the second end portion and coupling the second nut to the second end portion so as to retain the second seal therein. The method may further include the step of positioning an inner tube between the tubular long seal and the outer tube before step d). The method may further include the step of removing the inner tube from between the tubular long seal and the outer tube before step d).

BRIEF DESCRIPTION OF THE FIGURE

The FIGURE shows a cross-sectional view of a sheathing repair assembly consistent with at least one embodiment of the present disclosure.

DETAILED DESCRIPTION

Referring to the Figure, sheathing repair assembly 10 in accordance with some embodiments may include outer tube 44 having first and second end portions 51, 52, tubular long seal 46, first and second seals 42, 43 positioned in first end portion 51 and second end portion 52 of outer tube 44, respectively, and first and second nuts 40, 41 each retaining first and second seals 42, 43 in first and second end portions of outer tube 44. Sheathing repair assembly 10 may be used to repair a tension member such as tension member 27 where sheathing 29 is damaged or discontinuous. In one embodiment, a sheathing repair assembly may include inner tube 56. In another embodiment, a sheathing repair assembly does not include inner tube 56.

Outer tube 44 may be made of an elastomeric polymer. Outer tube 44 may be positioned over tension member 27 by sliding outer tube 44 from an end of the tension member to a location on the tension member. In some embodiments, each end portion 51, 52 of outer tube 44 may include engagement feature 54, such as threads, bayonet tabs or a groove or ridge, to facilitate engagement with first and second nuts 40, 41. In some embodiments, outer tube 44 may be provided without an engagement feature. In some embodiments, the inside diameter of outer tube 44 may be greater than the outside diameter of tubular long seal 46. In some embodiments, the inside diameter of outer tube 44 may be less than the outside diameter of tubular long seal 46. In some embodiments, the inside diameter of outer tube 44 may be substantially the same as the outside diameter of tubular long seal 46.

Tubular long seal 46 may be made of elastomeric polymer and may comprise a compressible elastomer. Tubular long seal 46 may be split longitudinally. Tubular long seal 46 may be applied from the side of tension member 27 by passing tension member 27 through the slit in tubular long seal 46, so that access to the end of tension member 27 is not required. Tubular long seal 46 may be sized to receive tension member 27 therein. In some embodiments, the inside diameter of tubular long seal 46 may be less than the outside diameter of tension member 27 so that the inner surface of tubular long seal 46 conforms to the outer surface of the tension member 27. In some embodiments, the inside diameter of tubular long seal 46 may be substantially the same as the outside diameter of tension member 27. In the embodiment depicted in the Figure, tubular long seal 46 is shorter than outer tube 44.

Optional inner tube 56 may be made of an elastomeric or non-elastomeric polymer, or a metal. In one embodiment, inner tube 56 may have a longitudinal split and may be applied from the side of the tension member. In another embodiment, inner tube 56 may have no split and may be positioned on the tension member by sliding inner tube 56 from the end of the tension member to a desired position. At least one end portion of inner tube 56 may include a hole, tab, or other feature to facilitate movement of inner tube 56. Inner tube 56 may be applied to the outside of tubular long seal 46 after tubular long seal 46 is applied to tension member 27 and before or after outer tube 44 is applied to the outside of tubular long seal 46. Inner tube 56 may facilitate the passage of tubular long seal 46 into outer tube 44, such as by radially compressing tubular long seal 46 or decreasing friction between tubular long seal 46 and outer tube 44. Inner tube 56 may protect tubular long seal 46 until outer tube 44 is applied to the outside of tubular long seal 46. The inside diameter of inner tube 56 may be substantially the same as or less than the outside diameter of tubular long seal 46. The outside diameter of inner tube 56 may be substantially the same as the inside diameter of outer tube 44. The outside diameter of inner tube 56 may be less than the inside diameter of outer tube 44.

First and second seal 42, 43 may be made of elastomeric polymer and may be split longitudinally. First and second seal 42, 43 may be applied from the side of tension member 27 by passing tension member 27 through the slit, so that access to the end of the tension member is not required. As shown in the Figure, when applied, first seal 42 is positioned in first end portion 51 of outer tube 44. Similarly, second seal 43 is positioned in second end portion 52 of outer tube 44.

Each of first and second nuts 40, 41 may mechanically engage outer tube 44 at engagement feature 54 at first end portion 51 and second end portion 52, respectively, of outer tube 44, and may include corresponding internal threads, bayonet tabs or a ridge or groove. In some embodiments, first and second nuts 40, 41 may be self-tapping nuts that create threads when threaded onto outer tube 44. In some embodiments, each of first and second nuts 40, 41 is a threaded or self-tapping nut engaged with outer tube 44.

In operation, when it is desired to repair an unsheathed portion of tension member 27, tubular long seal 46 is applied to the unsheathed portion. Tubular long seal 46 may be applied to tension member 27 at the unsheathed portion or may be applied elsewhere on the length of tension member 27 and slid along tension member 27 to the desired location. Tubular long seal 46 may be long enough to fully cover and, optionally, extend beyond the unsheathed portion of tension member 27 or, if a portion of sheathing 29 has been removed, tubular long seal 46 may be positioned between the ends of sheathing 29.

Inner tube 56 may be applied to the outside of tubular long seal 46 after tubular long seal 46 is applied to the tension member 27 and before or after tubular long seal 46 is positioned at the unsheathed portion thereof Inner tube 56 may already be present on tension member 27 or may be applied from the end of tension member 27.

Outer tube 44 may already be present on tension member 27 or may be applied from the end of tension member 27. First and second nuts 40, 41 may already be present or may be applied from the end of tension member 27. First and second nuts 40, 41 may be provided separately from outer tube 44 or may be engaged with outer tube 44 when applied to tension member 27. Outer tube 44 is positioned at a desired location on tension member 27. If first and second nuts 40, 41 are engaged with outer tube 44, first and second nuts 40, 41 may be de-coupled from outer tube 44 before proceeding.

In some embodiments, tubular long seal 46, optional inner tube 56, outer tube 44, and, optionally, first and second nuts 40, 41 may all be applied to a tension member 27 and then slid along the tension member 27 to a desired location on the tension member 27. In some embodiments, tubular long seal 46, optional inner tube 56, outer tube 44, and, optionally, first and second nuts 40, 41 may each be separately applied to a desired location on tension member 27. Some or all of the components of sheathing repair assembly 10 may be pre-assembled prior to delivery to the pour site or may be assembled at the pour site. For example, optional inner tube 56, outer tube 44, and first and second nuts 40, 41 may be preassembled. First and second seals 42, 43 may be but are not necessarily included in the pre-assembly. If first and second seals 42, 43 are included in pre-assembly, at least one of first and second seals 42, 43 may be removed from outer tube 44 before outer tube 44 is slid over tubular long seal 46.

With tubular long seal 46 and, optionally, inner tube 56 positioned at the desired location on tension member 27, outer tube 44 may be slid along the tension member so that tubular long seal 46 and inner tube 56, if present, are received therein. If inner tube 56 is present and if it is desired to remove inner tube 56 before completing the repair operation, inner tube 56 may be removed before first and second seal 42, 43 are inserted.

First and second seal 42, 43 are then inserted or re-inserted into first and second end portions of outer tube 44 and first and second nuts 40, 41 are mechanically coupled to the first and second end portions of outer tube 44, respectively. Each of first and second nuts 40, 41 retains and compresses first and second seal 42, 43, respectively. Each of first and second seal 42, 43 deforms so as to fill voids in the annular space defined between tension member 27, tubular long seal 46, outer tube 44 or optional inner tube 56, and first and second nuts 40, 41. In some embodiments, each of first and second seals 42, 43 is configured such that when first and second nuts 40, 41 fully engage outer tube 44, there may be no substantial voids in the annular space. In other embodiments, each of first and second seal 42, 43 is configured such that when first and second nuts 40, 41 fully engage outer tube 44, there may be substantially no voids in the annular space. In one embodiment, each nut 40, 41 may be tightened until fully engaged. In other embodiments, each nut 40, 41 is a self-tapping nut and may be tightened until the self-tapping nut bottoms out or begins to plastically deform. In another embodiment, each nut 40, 41 may be tightened until sealing occurs. In another embodiment, each nut 40, 41 may be tightened to a position to inhibit seepage of fluids that might corrode the strand.

When assembled, sheathing repair assembly 10 defines a longitudinal passage that is adapted to receive tension member 27 and sealingly engage the outer surface thereof. The presence of the sheathing repair assembly 10 on tension member 27 seals the portion of the tension member that is within the assembly, i.e. between first and second nuts 40, 41.

In each embodiment and each method described herein, repair of sheathing 29 may be for the purpose of re-sealing sheathing 29 that has become damaged or replacement of a sheathing layer on a portion of strand from which sheathing 29 has been removed to prevent the ingress of fluid into tension member 27.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure. Further, in the claims that follow, unless explicitly so recited, the sequential recitation of steps is not intended to require that the steps be performed sequentially.

What is claimed is:

1. A sheathing repair assembly for a tension member of a post-tensioning tendon, the sheathing repair assembly comprising:
    an outer tube having first and second end portions;
    a tubular long seal positioned inside the outer tube, wherein the tubular long seal is shorter than the outer tube;
    an inner tube positioned between the outer tube and the tubular long seal;
    a first seal positioned in the first end portion of the outer tube;
    a second seal positioned in the second end portion of the outer tube;
    a first nut retaining the first seal in the first end portion of the outer tube; and
    a second nut retaining the second seal in the second end portion of the outer tube;
    wherein the assembly defines a longitudinal passage adapted to receive the tension member.

2. The method of claim 1 wherein the inner tube radially compresses the tubular long seal.

3. The sheathing repair assembly of claim 1 wherein the first seal is configured such that mechanically coupling the first nut to the outer tube causes the first seal to fill a first annular space defined between the outer tube, the tubular long seal, the tension member, and the first nut, and wherein the second seal is configured such that mechanically coupling the second nut to the outer tube causes the second seal to fill a second annular space defined between the outer tube, the tubular long seal, the tension member, and the second nut.

4. The sheathing repair assembly of claim 1 wherein the first and second seals each has a longitudinal slit.

5. The sheathing repair assembly of claim 4 wherein the tubular long seal has a longitudinal slit.

6. The sheathing repair assembly of claim 1 wherein the tubular long seal is long enough to span an unsheathed portion of the tension member.

7. The sheathing repair assembly of claim 1 wherein at least one of the first and second nuts is a self-tapping nut.

8. The sheathing repair assembly of claim 1 wherein the tubular long seal comprises a compressible elastomer polymer.

9. A method for repairing an unsheathed portion of a tension member, comprising the steps of:
    a) providing a sheathing repair assembly comprising:
        an outer tube having first and second end portions;
        a tubular long seal sized to receive the tension member;
        a first seal configured to be positioned in the first end portion of the outer tube;
        a second seal configured to be positioned in the second end portion of the outer tube;
        a first nut configured to retain the first seal in the first end portion of the outer tube; and
        a second nut configured to retain the second seal in the second end portion of the outer tube;
    b) positioning the tubular long seal to span the unsheathed portion;
    c) positioning an inner tube between the tubular long seal and the outer tube;
    d) positioning the outer tube around the tubular long seal;
    e) inserting the first seal into the first end portion and coupling the first nut to the first end portion so as to retain the first seal therein; and
    f) inserting the second seal into the second end portion and coupling the second nut to the second end portion so as to retain the second seal therein;
    wherein completion of step f) seals a portion of the unsheathed portion of the tension member that is within the assembly.

10. The method of claim 9 wherein the inner tube radially compresses the tubular long seal.

11. The method of claim 9, further including the step of removing the inner tube from between the tubular long seal and the outer tube before step e).

12. The method of claim 9 wherein the tubular long seal has a longitudinal slit and step b) comprises applying the tubular long seal from the side of the tension member by passing the tension member through the longitudinal slit.

13. The method of claim 9 wherein the outer tube does not have a longitudinal slit and step d) comprises moving the outer tube from an end of the tension member to a desired location on the tension member.

14. The method of claim 9 wherein the first and second seals each have a longitudinal slit.

15. The method of claim 9 wherein the tubular long seal is long enough to fully cover the unsheathed portion.

16. The method of claim 9 wherein at least one of the first and second nuts is a self-tapping nut.

17. The method of claim 9 wherein the tubular long seal comprises a compressible elastomer polymer.

\* \* \* \* \*